US009083771B2

(12) United States Patent
Yurchenko

(10) Patent No.: US 9,083,771 B2
(45) Date of Patent: Jul. 14, 2015

(54) SYSTEM AND METHODS FOR MULTI-PARTICIPANT TELECONFERENCING USING PREFERRED FORMS OF TELECOMMUNICATION

(75) Inventor: Vitaliy Yurchenko, Newton, MA (US)

(73) Assignee: IBASIS, INC., Burlington, MA (US)

( * ) Notice: Subject to any disclaimer, the term of this patent is extended or adjusted under 35 U.S.C. 154(b) by 399 days.

(21) Appl. No.: 13/529,739

(22) Filed: Jun. 21, 2012

(65) Prior Publication Data
US 2013/0342635 A1    Dec. 26, 2013

(51) Int. Cl.
*H04N 7/14* (2006.01)
*H04L 29/06* (2006.01)
*H04L 12/18* (2006.01)
(Continued)

(52) U.S. Cl.
CPC ........ *H04L 65/4038* (2013.01); *H04L 12/1818* (2013.01); *H04L 65/1069* (2013.01); *H04L 67/306* (2013.01); *H04M 3/567* (2013.01); *H04L 65/1046* (2013.01); *H04L 67/141* (2013.01); *H04L 67/24* (2013.01)

(58) Field of Classification Search
CPC . G06F 15/16; H04L 12/1818; H04L 65/1046; H04L 65/1069; H04L 65/4038; H04L 67/24; H04L 67/141; H04L 67/306; H04M 3/56–3/568; H04M 15/00; H04M 2203/50–2203/509; H04Q 3/66
USPC .................. 348/14.01–14.16; 370/259–271, 370/351–357; 709/201–207, 217–248; 379/201.01, 202.01–207.01
See application file for complete search history.

(56) References Cited

U.S. PATENT DOCUMENTS

| | | | | |
|---|---|---|---|---|
| 6,870,916 | B2 * | 3/2005 | Henrikson et al. | 379/202.01 |
| 6,876,734 | B1 * | 4/2005 | Summers et al. | 379/202.01 |
| 6,898,274 | B1 * | 5/2005 | Galt et al. | 379/211.02 |

(Continued)

FOREIGN PATENT DOCUMENTS

| EP | 1761017 A1 | 3/2007 |
|---|---|---|
| GB | 2320641 A | 12/1996 |

OTHER PUBLICATIONS

International Search Report for International Application PCT/US2013/46314, dated Aug. 30, 2013.

*Primary Examiner* — Hemant Patel
(74) *Attorney, Agent, or Firm* — Sean D. Detweiler, Esq.; Morse, Barnes-Brown & Pendleton, P.C.

(57) ABSTRACT

A multi-participant teleconferencing system includes a telecommunication manager that is configured to establish telecommunication connections with participants by instructing and initiating one or more telecommunication devices (e.g., media gateway devices, email servers, web servers, multipoint control units, etc.). Participants can be enabled to provide personal preferences to the telecommunication manager. The personal preferences and other participant information can be stored on one or more storage devices as participant records. The participant records preferably include preferred forms of telecommunication for the participants. Each preferred form of telecommunication can include an indication of a preferred type of telecommunication device and/or an indication of a preferred telecommunication technology. The telecommunication manager can utilize the preferred forms of telecommunication stored on the one or more storage devices to schedule, manage, and initiate multi-participant telecommunication.

22 Claims, 8 Drawing Sheets

(51) Int. Cl.
*H04M 3/56* (2006.01)
*H04L 29/08* (2006.01)

(56) References Cited

U.S. PATENT DOCUMENTS

| | | | |
|---|---|---|---|
| 6,906,741 B2* | 6/2005 | Canova et al. | 348/14.08 |
| 7,792,253 B2* | 9/2010 | Agapi et al. | 379/88.14 |
| 8,194,837 B1* | 6/2012 | Weinman | 379/201.01 |
| 2004/0107256 A1* | 6/2004 | Odenwald et al. | 709/205 |
| 2005/0014490 A1* | 1/2005 | Desai et al. | 455/416 |
| 2006/0041648 A1 | 2/2006 | Horvitz | |
| 2006/0067297 A1* | 3/2006 | Chaar et al. | 370/352 |
| 2006/0123082 A1 | 6/2006 | Digate et al. | |
| 2007/0033251 A1* | 2/2007 | Mandalia et al. | 709/204 |
| 2007/0081651 A1* | 4/2007 | Iyer et al. | 379/202.01 |
| 2007/0250633 A1 | 10/2007 | Norby | |
| 2008/0043961 A1 | 2/2008 | Kim et al. | |
| 2008/0069011 A1* | 3/2008 | Sekaran et al. | 370/260 |
| 2009/0170557 A1* | 7/2009 | Chauhan et al. | 455/552.1 |
| 2010/0002859 A1* | 1/2010 | Hepworth et al. | 379/140 |
| 2010/0315483 A1* | 12/2010 | King | 348/14.08 |
| 2011/0179180 A1 | 7/2011 | Schleifer et al. | |

* cited by examiner

SYSTEM AND METHODS FOR MULTI-PARTICIPANT TELECONFERENCING USING PREFERRED FORMS OF TELECOMMUNICATION

FIELD OF THE INVENTION

The present invention relates to multi-participant conferencing over one or more telecommunications networks. More particularly, the present invention relates to systems and methods for scheduling, managing, and initiating telecommunication conferences ("teleconferences") using preferred forms of telecommunication.

BACKGROUND OF THE INVENTION

Teleconferencing is an increasingly popular form of communication. The recent expansion and advancement of telecommunication technology and telecommunication networks have enabled teleconferencing to offer an extremely viable alternative to in-person meetings. Modern teleconferencing technology is increasingly convenient, low-cost, and effective form of communication. Moreover, communities are becoming increasingly pan-national and even international. For example, as outsourcing increases, many industries require greater collaboration among participants in multiple countries.

These developments have led to an increase in the different types of participants utilizing teleconferencing, as well as the scope and regularity of such teleconferences. More participants are utilizing teleconferencing on a wider range of telecommunication devices, both for business and personal settings.

In view of this growth, the shortcomings of known teleconferencing systems are becoming increasingly problematic. In particular, known teleconferencing systems fail to provide participants with the ability to effectively and efficiently initiate teleconferences with minimal organizational effort. Rather, existing teleconferencing systems often require participants to agree upon particular teleconferencing details (e.g., which participants to invite, the preferred forms of telecommunication for the participants, etc.) in advance of initiating the teleconference. Furthermore, existing teleconference systems fail to offer participants the ability to schedule a teleconference in advance with minimal effort by the organizing participant. Rather, in existing systems, it is often the case that participants organizing the teleconference must personally contact each intended participant, inform them of the teleconference being scheduled, and then initiate the teleconference at the particular scheduled time.

Accordingly, known teleconference systems place an undesirable amount of work and effort on participants organizing teleconferences. This is increasingly problematic in the art given the increasingly routine nature of such teleconferences.

SUMMARY

There is a need for more efficient scheduling and managing of multi-participant teleconferences. The present invention is directed toward further solutions to address this and other needs, in addition to having other desirable characteristics that will be appreciated by those of skill in the art upon reading the present specification.

In accordance with an example embodiment of the present invention, a system for initiating a telecommunication connection between two or more participants is provided. The system can include a telecommunication manager configured in such a way as to manage selection of a form of telecommunication for each of the two or more participants when the telecommunication connection is desired between a plurality of telecommunication devices operable by the two or more participants. Participant data can be stored on one or more storage devices. The one or more storage devices can be in communication with the telecommunication manager. The one or more storage devices can contain a plurality of participant records, and each participant record can include at least one participant identifier each for identifying a participant. At least one of the plurality of participant records can have an indication of a preferred form of telecommunication for an associated participant when the telecommunication connection is desired. When the telecommunication connection is desired by a first of the two or more participants, the telecommunication manager can manage connection of each of a remainder of the two or more participants.

In accordance with aspects of the present invention, a presence server can be in communication with the telecommunication manager, and the presence server can manage information regarding availability, capability, and desirability of participants to communicate. A third party call control server can be in communication with the telecommunication manager, and the third party call control server can be configured to set up and manage the telecommunication connection between two or more participants. A video conferencing server can be in communication with the telecommunication manager, and the video conferencing server can be configured to interconnect a plurality of video conference telecommunication connections. The telecommunication connection can be configurable between multiple different telecommunication devices contemporaneously. The multiple different telecommunication devices can include one or more of telephones, mobile phones, internet phones, computers, smart phones, tablets, personal video units, or video phones. The telecommunication manager can be configured to cause the two or more participants to be provided with a hyperlink clickable to initiate the telecommunication connection.

In accordance with further aspects of the present invention, the indication of the preferred form of telecommunication can include telephone, VoIP, video conference, computer, text message, instant message, or shared screen or desktop. The data stored on one or more storage devices can include the data being stored in a cloud-based system or on a server. The preferred form of telecommunication can include a selection of one or more of device, telecommunication technology, event trigger, or time trigger. Only one participant of the two or more participants can have indicated the preferred form of telecommunication prior to initiation of the telecommunication connection, such that other of the two or more participants are contacted by the system when the telecommunication connection is desired without having indicated a preferred form of telecommunication. The telecommunication connection can occur utilizing two or more of a telephone, a mobile device, a computer, a video device, an analog device, a digital device, a messaging device, an email device, a VoIP device, a chat device, an electronic presence device, a virtual presence device, or any combination thereof. The form of telecommunication can be selected by the telecommunication manager according to the preferred form of telecommunication as indicated by at least one corresponding participant record of the plurality of participant records.

In accordance with an example embodiment of the present invention, a method of initiating a telecommunication connection between two or more participants is provided. A telecommunication manager can initiate a telecommunication by causing, using at least one processor, a request to be sent to each of the two or more participants based on information obtained from a plurality of participant records stored in one or more data storage devices. Each participant record can include at least one participant identifier for identifying a participant. At least one of the plurality of participant records can have an indication of a preferred form of telecommunication. The telecommunication manager can receive, through at least one input device, responses to the request from each of the two or more participants. The responses can be in the form of a telecommunication request to establish the telecommunication connection between the two or more participants. When the telecommunication connection couples together each of the two) or more participants, a form of telecommunication can be selected by the telecommunication manager according to the preferred form of telecommunication as indicated by at least one corresponding participant record of the plurality of participant records.

In accordance with aspects of the present invention, a presence server can manage information regarding availability, capability, and desirability of participants to communicate. The presence server can be in communication with the telecommunication manager. A third party call control server can set up and manage the telecommunication connection between two or more participants. The third party call control server can be in communication with the telecommunication manager. A video conferencing server can interconnect a plurality of video conference telecommunication connections, and the video conferencing server can be in communication with the telecommunication manager. The telecommunication connection can be configurable between multiple different telecommunication devices contemporaneously. The multiple different telecommunication devices can include one or more of telephones, mobile phones, internet phones, computers, smart phones, tablets, personal video units, or video phones. The telecommunication manager can cause the two or more participants to be provided with a hyperlink clickable to initiate the telecommunication connection. The preferred form of telecommunication can include a selection of one or more of device, telecommunication technology, event trigger, or time trigger. Causing the request to be sent to each of the two or more participants can include causing a telecommunication invitation to be sent to each of the two or more participants. For at least one of the two or more participants, the telecommunication invitation can be specific to a preferred form of telecommunication indicated in one of the plurality of participant records.

In accordance with further aspects of the present invention, a teleconference request to initiate or schedule a teleconference between the two or more participants can be received from one of the two or more participants, through at least one input device. The step of initiating the telecommunication can be based on the step of receiving the teleconference request. The telecommunication manager can cause, using at leak one processor, a notification of the requested teleconference to be sent to each of the two or more participants prior to the step of initiating the telecommunication. Causing the request to be sent to each of the two or more participants can include accessing one or more remote storage devices in real time to obtain contact information enabling at least one of the two or more participants to be contacted using a preferred form of telecommunication as indicated in one of the plurality of participant records. The telecommunication manager can cause, using at least one processor, an initial invitation to be sent to the two or more participants prior to the step of initiating the telecommunication.

In accordance with an example embodiment of the present invention, a computer-implemented method is provided for initiating a teleconference between at least a first participant and a second participant. A request to initiate or schedule a teleconference between at least the first participant and the second participant can be received through at least one input device. An indication of a preferred form of telecommunication for at least the first participant can be obtained using at least one processor. The preferred form of telecommunication can be stored on one or more storage devices. A first invitation can be caused, using at least one processor, to be sent to the first participant. A second invitation can be caused, using at least one processor, to be sent to the second participant. The first invitation can be of a type that is specific to the preferred form of telecommunication for the first participant, and the first invitation can enable the first participant to join the teleconference using the preferred form of telecommunication.

In accordance with aspects of the present invention, a notification of the teleconference can be caused, using at least one processor, to be sent to each of the first participant and the second participant prior to the step of causing the first invitation to be sent to the first participant and the second invitation to be sent to the second participant. The step of causing a first invitation to be sent to the first participant can include accessing the one or more storage devices in real time to obtain contact information for contacting the first participant according to the preferred form of telecommunication. The activation of one or more triggers associated with the first participant can be awaited prior to the step of causing the first invitation to be sent to the first participant. The one or more triggers can be stored on the one or more storage devices. The request to initiate or schedule a teleconference can be a request to schedule a teleconference. An initial invitation can be caused, using at least one processor, to be sent to the first participant, the second participant, or both prior to the step of causing the first invitation to be sent to the first participant, prior to the step of causing the second invitation to be sent to the second participant, or prior to both.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
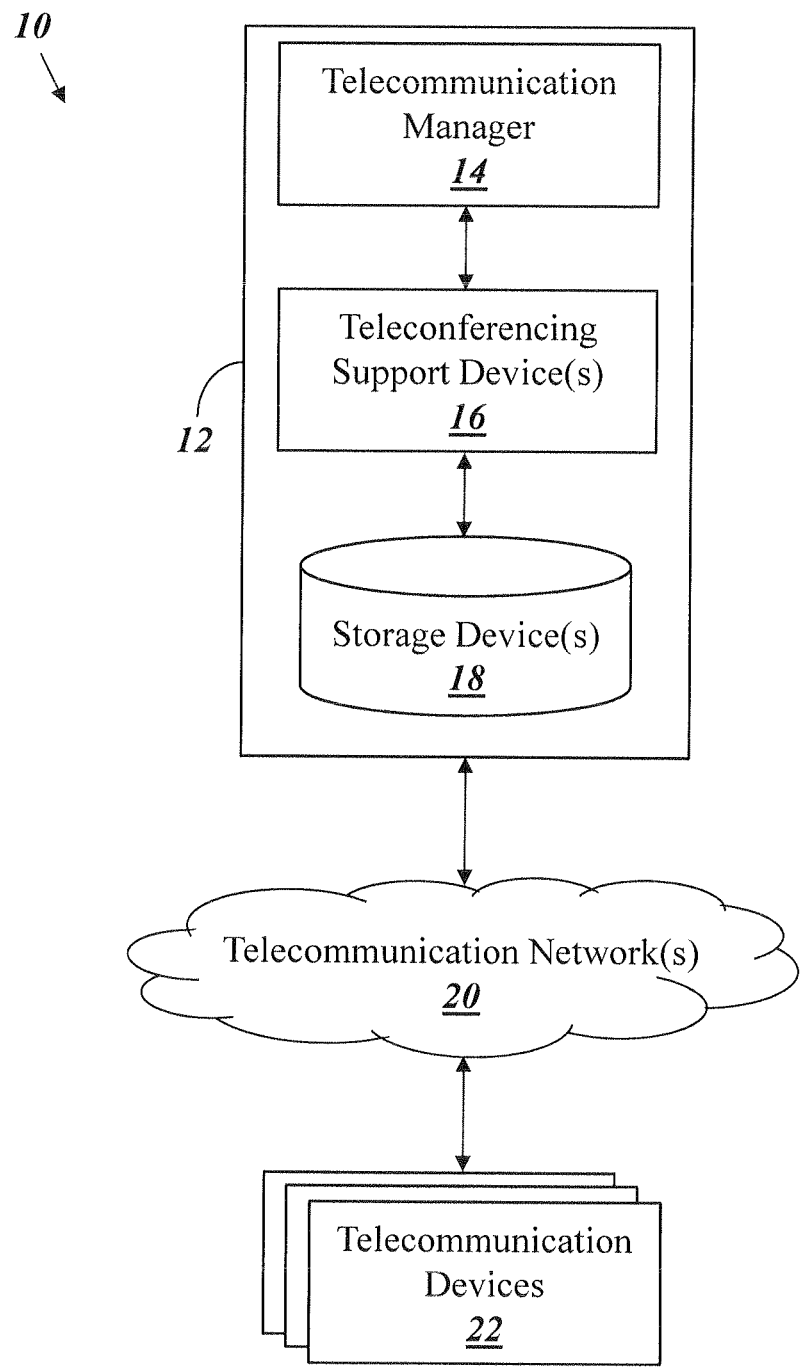
FIG. 1 is a diagrammatic illustration of a system for supporting a plurality of forms of telecommunication, according to an example embodiment of the present invention.

An illustrative embodiment of the present invention relates to a system for enabling multi-participant teleconferencing. The system includes a telecommunication manager that establishes telecommunication connections with the participants by instructing one or more telecommunication devices (e.g., media gateway devices, email servers, web servers, multipoint control units, and the like). Participants are enabled to provide personal preferences to the telecommunication manager. These preferences can be stored in a plurality of participant records on one or more storage devices. The participant records can include preferred forms of telecommunication for the participants. For example, each preferred form of telecommunication can include an indication of a preferred type of telecommunication devices and/or an indication of a preferred telecommunication technology. The telecommunication manager can utilize the preferred forms of telecommunication when scheduling, managing, and initiating multi-participant telecommunication. Moreover, the telecommunication manager is equipped and configured to enable telecommunication between different types of telecommunication devices and across different types of telecommunication networks or platforms (e.g., packet-switched, IP-based, circuit-switched, etc.). As such, a participant attempting to organize a teleconference is enabled to submit a teleconference request (e.g., electronically through at least one output device) without specifying in the request the preferred form of telecommunication for any participant invitees for whom such information is pre-stored in the participant records.

Notably, systems according to embodiments of the present invention eliminate the need for participants organizing teleconferences to determine the particular desired forms of telecommunication of participant invitees in advance of scheduling or initiating the teleconference. Additionally, for participants wishing to schedule teleconferences in advance of a proposed or agreed-upon teleconference time, the systems according to illustrative embodiments of the present invention provide useful scheduling capabilities enabling coordination despite different preferred forms of telecommunication and despite the use of different forms of telecommunication. In illustrative embodiments of the present invention, much of the work contacting participant invitees, inviting the participant invitees, and managing the forms of telecommunication for the participants of the teleconference are shifted to the management system 12 and away from participant organizing the teleconference.

As used herein, a "teleconference" generally refers to any live exchange (e.g., one-way exchange, two-way exchange, etc.) between two or more participants conducted on one or more telecommunication devices or systems over one or more telecommunication networks. Teleconferences can include live conferences, live meetings, audio/video calls, collaboration sessions, and any other live connection or live exchange conducted between two or more telecommunication devices or systems over one or more telecommunication networks. The exchange can be conducted with any suitable telecommunication device or system, as would be appreciated by one of skill in the art upon reading the present specification. This can include, as non-limiting examples, telephony devices (e.g., mobile phones, landline phones, smartphones, internet phones, etc.), text messaging devices (e.g., SMS devices, MMS devices, etc.), instant messaging devices, video conferencing devices, multimedia conferencing devices, audio conferencing devices, devices for establishing a shared screen/desktop, telepresence conferencing devices, any computing device equipped for telecommunication (e.g., personal computers, laptop computers, tablet computers, etc.), and any other suitable telecommunication device. Embodiments of the present invention are not limited to the types of telecommunication devices or systems between which telecommunication is established. One of skill in the art will appreciate a wide variety of other suitable telecommunication devices and systems upon reading the present specification. All such alternative devices and systems are contemplated within the scope of the present invention.

FIGS. 1 through 8, wherein like parts are designated by like reference numerals throughout, illustrate example embodiments of systems and methods for multi-participant conferencing according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed in a manner still in keeping with the spirit and scope of the present invention.

FIG. 1 depicts a system 10 configured to enable telecommunication between a plurality of participants, according to an example embodiment of the present invention. The system 10 generally can include a management system 12 and a plurality of telecommunication devices 22, e.g., operated by the participants in the telecommunication. The management system 12 and the telecommunication devices 22 are connected by one or more telecommunication networks 20, thereby allowing the management system 12 to initiate multi-participant teleconferencing between multiple telecommunication devices 22. As described herein, the telecommunication devices 22 generally can include any suitable telecommunication device, including the following non-limiting examples: telephony devices (e.g., mobile phones, landline phones, smartphones, internet phones, etc.), text messaging devices (e.g., SMS devices, MMS devices, etc.), instant messaging devices, video conferencing devices, multimedia conferencing devices, audio conferencing devices, devices for establishing a shared screen/desktop, telepresence conferencing devices, any computing device equipped for telecommunication (e.g., personal computers, laptop computers, tablet computers, etc.), and any other suitable telecommunication device.

The management system 12 can include one or more teleconferencing support devices 16 configured to enable a variety of different forms of telecommunication between the telecommunication devices 22. Alternatively to including the one or more teleconferencing support devices 16 in the management system 12, some or all of the teleconferencing support devices 16 can be provided by a third party (e.g., a network provider), such that some or all of the teleconferencing support devices 16 are excluded from the management system 12. The management system 12 further includes a telecommunication manager 14 (e.g., implemented on a computer server or other computing device) connected to the teleconferencing support devices 16 and configured to manage and coordinate telecommunication between the telecommunication devices 22. One or more storage devices 18 can be included in the management system 12 and can be adapted to store and organize information about, associated with, and/or provided by participants operating the telecommunication devices 22, herein referred to as "participant information." The participant information can be stored in the one or more storage devices 18, e.g., in one or more databases, data stores, etc. The participant information can be utilized by the telecommunication manager 14 to coordinate, manage, and initiate telecommunication between the telecommunication devices 22 in specific desired ways.

Figure 2:
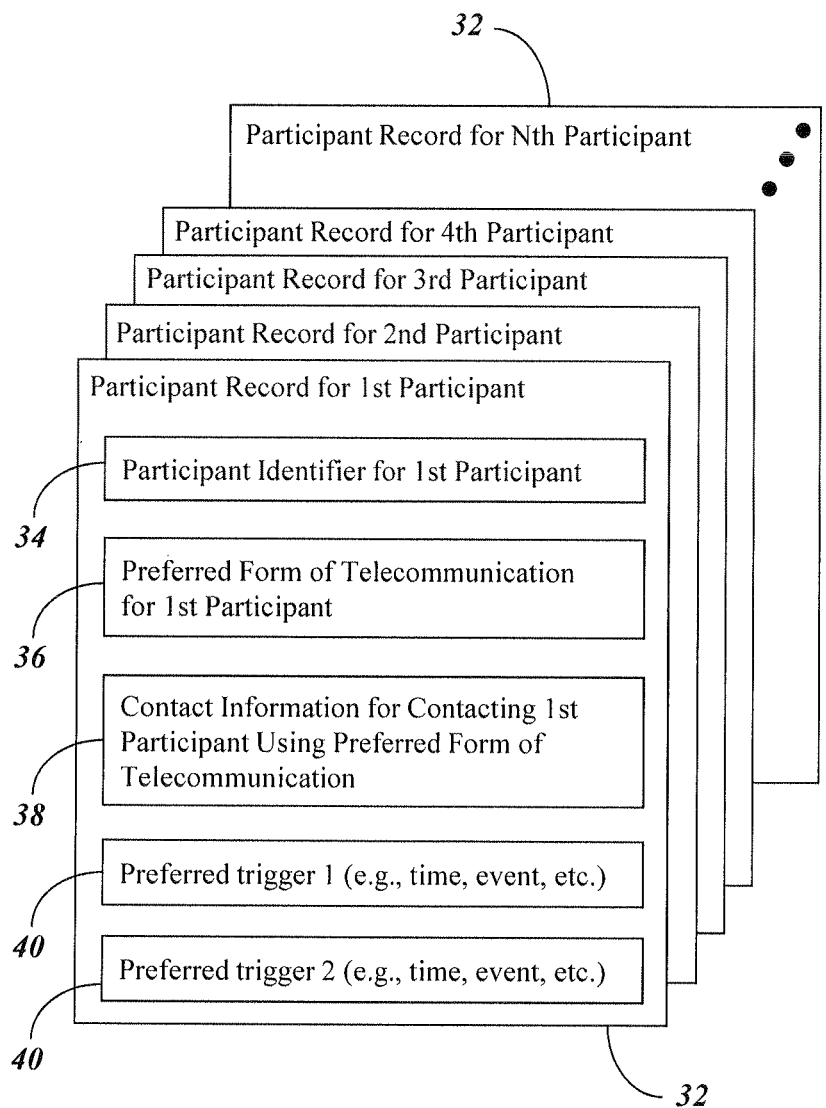
FIG. 2 is a diagrammatic illustration of a plurality of participant records, according to aspects of the present invention.

In an illustrative embodiment, the telecommunication manager 14 makes use of a plurality of participant records when scheduling, managing, initiating, and conducting (e.g., updating) multi-participant teleconferences. For example, FIG. 2 schematically depicts a plurality of participant records 32 according to an example embodiment of the present invention. Each participant record 32 can include a participant identifier 34 that identifies a specific participant. Each participant record 32 further can include a preferred form of telecommunication 36 for the associated participant. The preferred form of telecommunication 36 can include a selection/indication of one or more preferred types of telecommunication devices (e.g., mobile phone, landline phone, computer, videoconferencing device, etc.). The preferred form of telecommunication 36 also can include a selection/indication of one or more preferred telecommunication technologies, such as specific types of telecommunication software applications (e.g., video conferencing software, instant messaging software, etc.), specific brands of telecommunication software applications (e.g., Skype, provided by Microsoft Corporation, headquartered in Redmond, Wash.), specific versions, specific operating systems, and/or any other suitable technology specification.

The participant records 32 each can include contact information 38 enabling the associated participant to be contacted using the preferred form of telecommunication 36. Each participant record 32 further can include one or more preferred triggers 40. The preferred triggers 40 can define one or more criteria that, when satisfied, result in the participant associated with that participant record 32 being invited to a teleconference. For example, the preferred triggers 40 can be time triggers (e.g., "for any teleconferences scheduled for or initiated on a Wednesday, only invite me between the hours of 10 AM and 3:30 PM"), event triggers (e.g., "invite me whenever participant A and participant B have a teleconference"), combinations thereof (e.g., "invite me exactly thirty minutes after the initiation of any teleconference between participant A and participant B"), or any other suitable type of trigger.

The present invention is not exclusively limited to the illustrative examples of participant records 32 provided herein and depicted in FIG. 2. Upon reading the present specification, one of skill in the art will appreciate yet other participant preferences and yet other types of participant information that can be stored and organized in the participant records 32 to implement the features described herein. All such alternatives and modifications are contemplated within the scope of the present invention.

The participant records 32 can be useful, e.g., in allowing participants to submit a general request for the telecommunication manager 14 to schedule or initiate a teleconference (e.g., a "teleconference request"). The teleconference request can be "general" in the sense that it need not specify the particular forms of telecommunication that will be utilized by any participants to be invited to the teleconference who are represented in the participant records 32 as having a preferred form of telecommunication 36. Rather, for any such participants of the teleconference (e.g., participants named as invitees in the teleconference request, the organizing participant that originated the request, admin or default participants, etc.), the form of telecommunication for the requested teleconference can be automatically selected by the telecommunication manager 14 based on the preferences (e.g., the preferred forms of telecommunication 36, etc.) stored in the participant records 32. Thus, the teleconference request can be effectively "blind" to forms of telecommunication to be used by the various participants. Accordingly, the coordination, scheduling, and management of the types of telecommunication can be performed automatically by the telecommunication manager 14 according to the pre-stored preferences and information in the participant records 32, thereby shifting this burden away from the participant organizing the teleconference and submitting the teleconference request.

As stated briefly above, the participant records 32 eliminate a substantial scheduling/conferencing hurdle facing participants wishing to schedule/initiate multi-participant teleconferences. In particular, participants that organize teleconferences using the management system 12 according to embodiments of the present invention are no longer required to determine specific desired forms of telecommunication by the various participant invitees in advance of scheduling/initiating the teleconferences. Thus, embodiments of the present invention make it possible to utilize a standardized form or mechanism for requesting teleconferences. The form or mechanism for submitting teleconference requests can be substantially the same, regardless of the preferred form of telecommunication of the organizing participant and regardless of the preferred forms of telecommunication of the participant invitees. For example, in one embodiment described in greater detail herein, every participant is enabled to submit a teleconference request by sending an email. Many other combinations of telecommunication technologies are contemplated in the implementation of the present invention.

Furthermore, embodiments of the present invention can be used not only to ease the processes of scheduling/initiating teleconferences, but also can be used to allow automation of certain types of teleconferences, e.g., regular repeating teleconferences and/or teleconferences setting off participants' preferred triggers.

In general, the storage location of the information contained in the participant records 32 can vary as will be appreciated by one of skill in the art upon reading the present specification, e.g., depending on the intended implementation or application. For example, some or all of the participant records 32 can be stored in the one or more storage devices 18, as described previously herein. Alternatively, some or all of the participant records 32 or can be stored on any other suitably accessible store device(s). For example, the participant records 32 can be stored on a cloud storage device and/or on one or more remote network-accessible devices.

Accordingly, it should be appreciated that in some embodiments of the present invention, some or all of the information forming the participant records 32 is spread across multiple storage devices, which can optionally include the one or more storage devices 18 and/or one or more storage devices that are excluded from the management system 12. For example, in some embodiments, the contact information 38 of the participant records 32 is stored in one or more remote network-accessible devices (e.g., across one or more databases containing a staff directory for a company accessible via the company's private network), whereas the preferred forms of telecommunication 36 of the very same participant records 32 are stored on the one or more storage devices 18 of the management system 12. In such embodiments, the management system 12 can be configured to access the contact information 38 on the remote network-accessible devices (e.g., the databases of the private company network containing the staff directory) at the time of scheduling and/or initiating the teleconference, or at another time. In some embodiments, the contact information 38 of some or all participants is gathered by the management system 12 in real-time (e.g., without perceivable delay) when the telecommunication manager 14 initiates the teleconference and attempts to establish a telecommunication connection with such participants.

One of skill in the art will appreciate a wide variety of alternative ways to store and access information forming the participant records 32, e.g., depending on the particular implementation and the intended application of the system 10. All such alternatives and modifications are contemplated within the scope of the present invention. The present invention is in no way limited to the specific example embodiments described herein.

The participant identifiers 34 generally can be any identifier that is suitable for identifying the participants and/or associating the preferences with specific participants. As some non-limiting examples, the participant identifiers 34 can include a name (e.g., any arbitrary or randomly selected name, a username, and any other type of name), a telephone number, an email address, a text address, a device address (e.g., an IP address), a DN address, an ID, a company name, a unique text string, any other suitable identifier, or combinations thereof. It should be appreciated that the present invention is in no way limited to the specific examples provided herein. One of skill in the art will appreciate a wide variety of alternative types of participant identifiers 34. All such alternatives and modifications are contemplated within the scope of the present invention.

Moreover, it should be appreciated that embodiments of the present invention are not limited to any specific forms or examples of telecommunication. Rather, the system 10 can be configured to provide the functionality described herein for any suitable form of telecommunication, as would be appreciated by one of skill in the art. This can include, as non-limiting examples of forms of telecommunication, telephony (e.g., on landline phones, mobile phones, smartphones), IP telephony (e.g., internet phones, VoIP devices), videotelephony (e.g., videophone, video conferencing, webcam, video chat, telepresence conferencing, etc.), any text-based form of telecommunication (e.g., SMS, MMS, instant messaging, etc.), any audio-based form of telecommunication, any video-based form of telecommunication, any multimedia-based form of telecommunication, telecommunication established via shared screen(s) and/or shared desktop(s), and any other suitable form of telecommunication. Those of skill in the art will appreciate yet other suitable forms of telecommunication upon reading the present specification. The particular forms of telecommunication supported by the system 10 can depend on the intended applications and the specific desired implementations. All such alternatives, modifications, and combinations are contemplated within the scope of the present invention.

Embodiments of the present invention are not limited to any specific mechanisms for submitting teleconference requests. Rather, participants can be enabled to submit teleconference requests using any suitable mechanism, device, or software application. This can include, as non-limiting examples, email submissions of teleconference requests, user interface (UI) submissions of a teleconference request (e.g., where the UI is provided by a website, by a local/native computer software application running on the telecommunication devices 22, etc.), any suitable telephony submissions (e.g., radio telephony, wire-based telephony, IP telephony, videotelephony, etc.), and any other suitable mechanism for submitting a teleconference request. In addition, participants can be enabled to submit teleconference requests using any suitable device. For example, participants can be enabled to submit teleconference requests using a computing device; or using landline phones, mobile phones, smartphones, internet phones, IP phones, videophones, and the like. One of skill in the art will appreciate yet alternative ways and devices for enabling participants to submit teleconference requests. All such alternatives and modifications are contemplated within the scope of the present invention.

Figure 3:
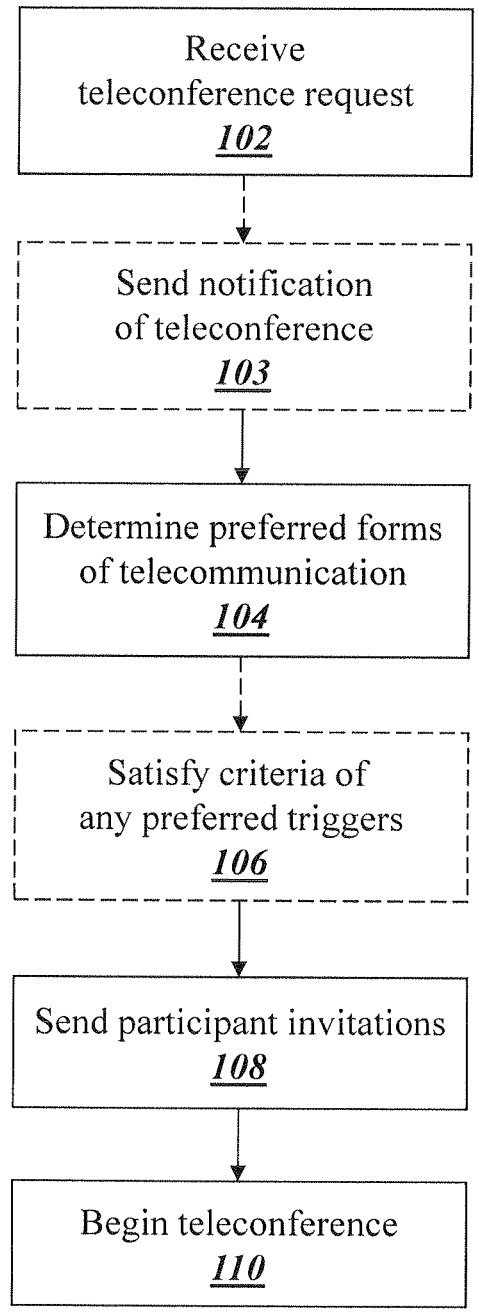
FIG. 3 is a flow chart of a method for scheduling, managing, and initiating a multi-participant telecommunication conference, according to an example embodiment of the present invention.

FIG. 3 depicts a method by which the management system 12 schedules, manages, and initiates a multi-participant teleconference between two or more telecommunication devices 22, according to an example embodiment of the present invention. The management system 12 receives, through at least one input device, a teleconference request (e.g., in its original submitted form, in a decoded form, etc.) (step 102). In response to the received teleconference request, the management system 12 optionally can send, through at least one output device, notifications of the requested teleconference to the intended participants (e.g., participants listed as invitees in the received teleconference request, the participant originating the teleconference request, etc.) of the teleconference (step 103). For example, in situations where the received teleconference request is a request to schedule a teleconference to occur at some future time rather than a request to initiate a teleconference at the present time, the notifications can include calendar appointments formatted for conventional calendar software applications (e.g., Microsoft Outlook calendar appointments, sold by Microsoft Corporation, headquartered in Redmond, Wash.). Such calendar appointments can be sent in step 103 by one or more email servers included in the management system 12 (not depicted in FIG. 1). Alternatively or additionally to including calendar appointments, the notifications can include text messages, email messages, messages from automated or non-automated calling services, and any other type of notification. The notifications sent in step 103 can include information about the teleconference, such as a time of the teleconference, a date of the teleconference, a duration of the teleconference, a list of participants, subjects/topics to discuss, reasons for meeting, and the like.

Based on the teleconference request received in step 102, the telecommunication manager 14 determines the preferred form(s) of telecommunication for some or all the intended participants of the teleconference (step 104). In an illustrative embodiment, the telecommunication manager 14 performs step 104 by searching the storage device(s) 18 for participant records 32 matching the intended participants of the teleconference and retrieving the preferred form(s) of telecommunication 36 from matching participant records 32.

Optionally, step 104 can also include the telecommunication manager 14 retrieving the contact information 38 (if available) from the matching participant records 32 associated with the participants of the requested teleconference. If one or more preferred triggers 40 exist in the participant records 32 found to match the intended participants, then the management system 12 can satisfy any criteria defined by the preferred trigger(s) 40 prior to or when sending an invitation to the participant(s) associated with those existing preferred trigger(s) 40 (step 106). In some instances, the teleconference request that is received in step 102 will be a request to schedule a teleconference at some specified time in the future. In such instances, once the specified meeting time is reached (and once the preferred triggers 40 are activated for each intended participant of the teleconference having such preferred triggers 40), the telecommunication manager 14 will cause, using at least one processor, the appropriate participant invitations to be sent to the appropriate participants (e.g., the invited participants, the organizing participant that originated the teleconference request, default participants, admin participants, etc.) (step 108). Alternatively, in situations where the teleconference request received in step 102 is a request to immediately initiate a teleconference, step 108 can occur immediately (or as soon as the preferred triggers 40 have been activated for any intended participants having such preferred triggers 40). As participants accept the invitations sent in step 108, and as the teleconferencing support devices 16 establish connections with the telecommunication devices 22, the teleconference begins (step 110).

It should be appreciated that step 110 of beginning the teleconference can continue over the course of a teleconference, e.g., as additional participants accept the invitations sent in step 108. Accordingly, conventional hosting and initiation procedures can be utilized, as would be understood to those of skill in the art upon reading the present specification. For example, when implemented with session initiation protocol (SIP), "re-invites" can be sent to the appropriate devices, e.g., to add additional media streams to the teleconference as additional participants accept the invitations sent in step 108.

Upon reading the present specification, one of skill in the art will appreciate that step 104 of determining the preferred form(s) of telecommunication (e.g., for those participants for whom at least one preferred form of telecommunication is accessible) can occur at any suitable moment. For example, step 104 can occur simultaneously with step 103 of sending notifications, simultaneously with step 108 of sending participant invitations, and/or simultaneously with step 110 of beginning the teleconference. Step 104 alternatively can occur at other moments (e.g., before or after step 103, before or after step 108, and/or before or after step 110), as would be appreciated by one of skill in the art upon reading the present specification.

The invitations sent in step 108 generally take any suitable form. In illustrative embodiments, each invitation is specific to a particular form of telecommunication. Accordingly, in illustrative embodiments, for each participant that is invited to the conference and is represented in the participant records 32 as having a preferred form of telecommunication 36, the format of the invitation is selected in step 108 based on the particular preferred form of telecommunication 36 determined in step 104. Stated differently, each invitation sent in step 108 can be specifically customized to enable the recipient participant of the invitation to join the teleconference using that participant's preferred form of telecommunication 36. Thus, when the teleconference begins in step 110, the connections with the participants are established in accordance with the participants' preferred forms of telecommunication 36.

Figure 4:
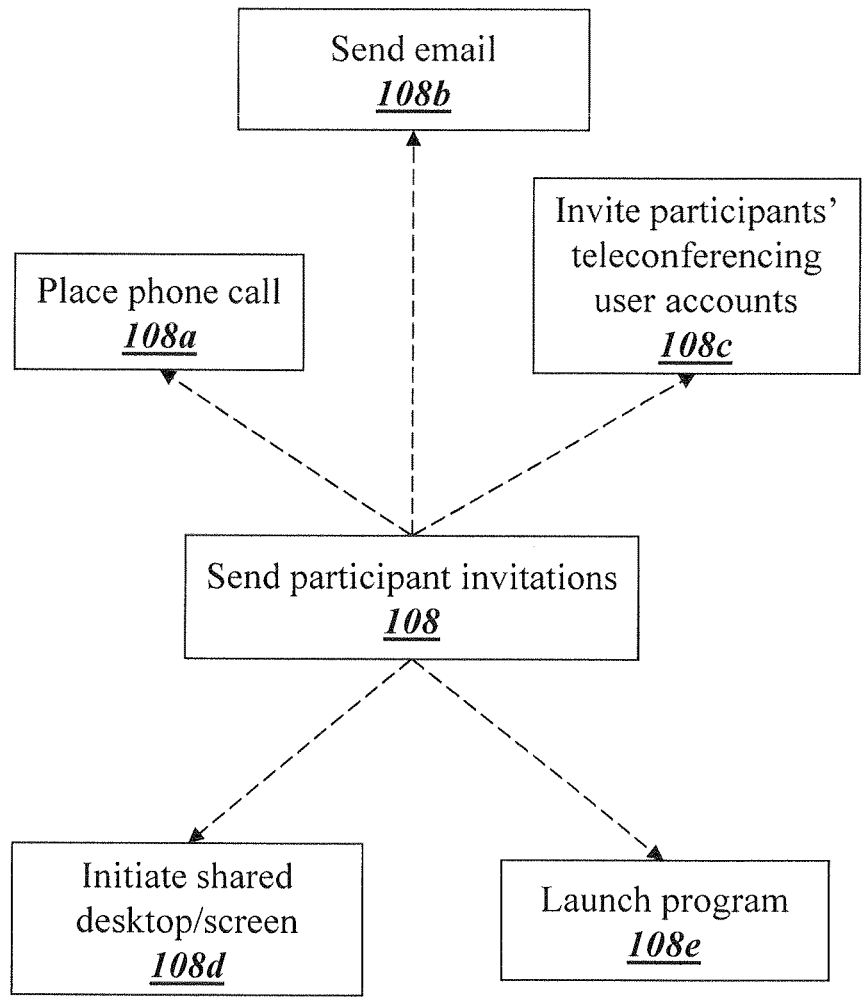
FIG. 4 is a diagrammatic illustration of different ways to perform the step of sending participant invites of the method of FIG. 3, according to aspects of the present invention.

FIG. 4 depicts several non-limiting examples of how step 108 of sending the participant invitations can be performed. For example, step 108 can include placing phone call(s) (landline, mobile, voice over IP, etc.), e.g., at the time of the teleconference (step 108a). Step 108 also can include sending an email message, e.g., at the time of the teleconference (step 108b). The email sent in step 108b can include instructions for joining a teleconference (e.g., "call this number," "click this link," etc.). Additionally or alternatively, step 108 can include sending an invitation to participants' teleconferencing user accounts using conventional teleconferencing software (step 108c). For example, step 108c can include causing a dialog box to be displayed within a videoconferencing application running on a telecommunication device 22 stating, "You've been invited to a call by User ABC. Click here to answer the call." Furthermore, step 108 can include initiating a shared desktop and/or a shared screen at the time of the teleconference (step 108d). Additionally or alternatively, step 108 can include launching a program (e.g., an individual local/native computer application stored on one of the telecommunication devices 22) at the time of the teleconference that enables the participant to join the teleconference (step 108e). One of skill in the art will appreciate a wide variety of yet alternative types of invitations and ways to send such invitations. All such alternatives and modifications are contemplated within the scope of the present invention. The present invention is not limited to the example embodiments described herein.

Figure 5:
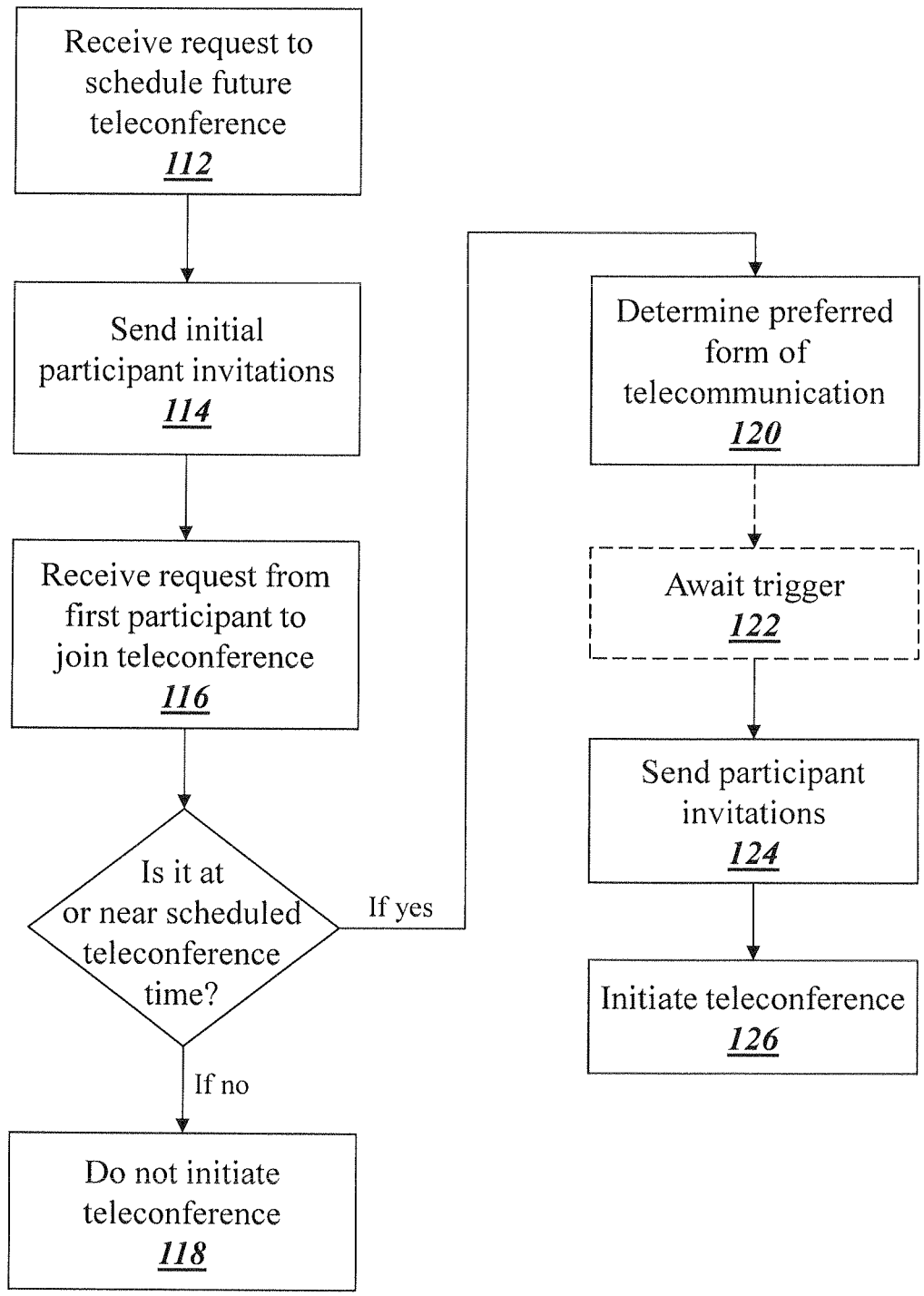
FIG. 5 is a flow chart of a method for scheduling, managing, and initiating a multi-participant telecommunication conference with initial invitations, according to an example embodiment of the present invention.

Some embodiments utilize an invitation procedure involving successive or tiered invitations being sent and accepted by the user to initiate a telecommunication connection with the management system 12. For example, FIG. 5 depicts a method according to example embodiment in which an initial invitation is sent prior to a listed teleconference time in a teleconference request for a multi-participant teleconference. The management system 12 receives, through at least one input device, a request to schedule a multi-participant teleconference at some time in the future (step 112). Upon the management system 12 receiving the teleconference request in step 102, the management system 12 sends, through at least one output device, an initial participant invitation (e.g., an email, calendar invitation, etc.) to each participant of the teleconference (step 114). For example, the initial invitations can contain information about the teleconference, as well as instructions describing how to join the teleconference at the scheduled teleconference time (e.g., "at 10 AM on Friday morning local time (11 AM EST), click the following link to join the teleconference . . . "). In illustrative embodiments, the initial participant invitations are sent in step 114 as soon as the management system 12 receives and processes teleconference the request, e.g., well in advance of the scheduled teleconference time (hours, days, etc.). In such embodiments, the initial invitations sent in step 114 also serve the function of the notifications sent in step 103 of FIG. 3.

Subsequent to sending the initial participant invitations in step 114, a first participant can follow the instructions contained in the initial participant invitation (e.g., can select the link contained therein). Upon doing so, the management system 12 receives, through at least one input device, a request from the first participant to join the teleconference (step 116). If the request to join in step 116 is not received at or near (e.g., within a predetermined amount of time from) the scheduled teleconference time, then the management system 12 does not initiate the teleconference based on the received request to join from the first participant (step 118). Alternatively, if the request to join is received in step 116 at or near the scheduled teleconference time, the management system 12 follows the initiation sequence of steps 120 through 126 for the first participant, in the same manner as described previously generally herein with reference to steps 104 through 110 in FIG. 3.

In some embodiments, the initial participant invitations sent in step 114 are invitations to RSVP for the teleconference. For example, the initial participant invitations sent in step 114 can be an email including selectable buttons that, when clicked, send an indication to the management system 12 either (a) to send a follow-up invitation to the participant in step 124 at/near the time of the teleconference or (b) to not send a follow-up invitation to the participant at/near the time of the teleconference. In such embodiments, the follow-up invitation sent in step 124 can be sent to some or all of the participants automatically, e.g., without requiring the participants to first request to join the teleconference at or near the scheduled time in step 116.

Figure 6:
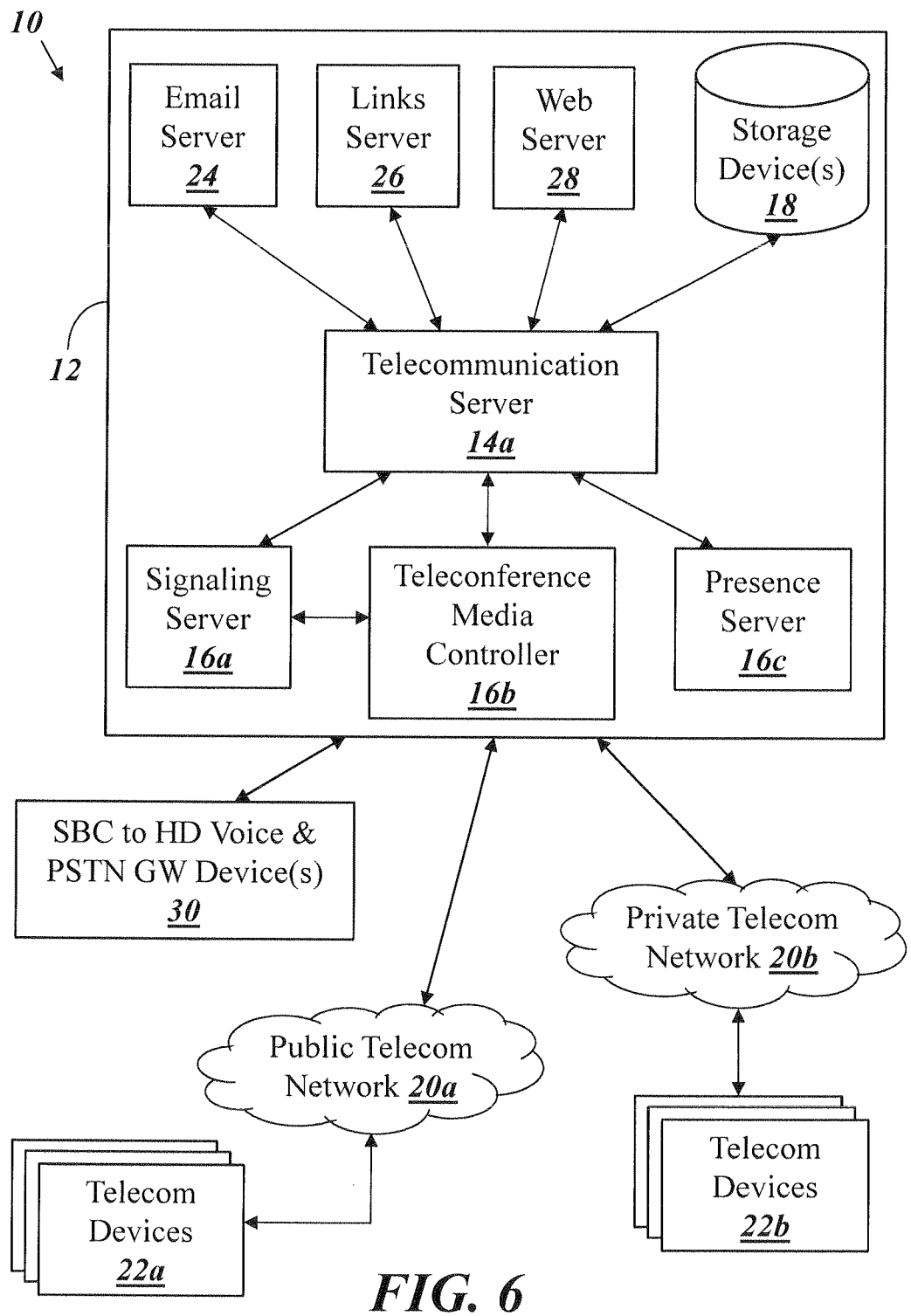
FIG. 6 is a schematic representation of a system for supporting audio, video, text, and other telecommunication across different types of telecommunication networks, according to an example embodiment of the present invention.

FIG. 6 depicts an example embodiment of the system 10 implemented to host telecommunication between IP-based networks (and/or other networks using data-switching nodes) and PSTNs (and/or other circuit-switched networks). The system 10 as implemented in FIG. 6 supports multi-participant conferencing using a wide variety of forms of telecommunication (e.g., phone calls, video conferencing, telepresence conferencing, text messaging, instant messaging, shared screen/desktop, etc.) that can be conducted on a wide variety of telecommunication devices 22 and over a wide variety of different telecommunication networks 20. For instance, as depicted in the example embodiment of FIG. 6, the telecommunication devices 22 include a first set of telecommunication devices 22a connected to the management system 12 via a public telecommunication network 20a and a second set of telecommunication devices 22b connected to the management system 12 via a private telecommunication network 20b. It should be appreciated that FIG. 6 merely depicts an illustrative and non-limiting example of the types and number of telecommunication networks 20 that can be included.

In the example embodiment of FIG. 6, the telecommunication manager 14 includes a telecommunication server 14a. The telecommunication sever 14a is logically coupled to the storage device(s) 18 and to a plurality of servers, including one or more email servers 24, one or more mail links servers 26, and/or one or more web servers 28. The various servers 24, 26, 28 enable the management system 12 send teleconference invitations to the telecommunication devices 22a, 22b in a plurality of different ways. For example, the email server(s) 24 are configured to be initiated to send invitations to participant email accounts upon being so instructed by the telecommunication server 14a. The links server(s) 26 are configured to generate links (upon being instructed to do so by the telecommunication server 14a) to teleconferences that, when selected, enable users to join a teleconference. The web server(s) 28 are configured to host web pages enabling participants to join teleconferences, as instructed by the telecommunication server 14a. For example, the web pages can include the links generated by the links server(s) 26, as well as additional information (e.g., presence information obtained by the presence server 16c).

One or more of the servers 24, 26, 28 additionally can be utilized to enable participants to submit teleconference requests to the telecommunication server 14a. For example, the email server(s) 24 can be configured receive teleconference requests sent via email. As yet another example, the web server(s) 28 can be configured to host and present to the telecommunication devices 22a, 22b one or more web pages containing UI forms for submitting teleconference requests to the telecommunication server 14a. As stated previously, it should be appreciated that the example submission mechanisms described herein are illustrative and in no way limit embodiments of the present invention.

The telecommunication server 14a can be coupled to specific teleconferencing support devices 16 that enable the particular desired forms of telecommunication. For example, the system 10 in the example embodiment of FIG. 6 hosts video conferencing, audio conferencing, multimedia conferencing, shared screen/desktop capabilities, text messaging, instant messaging, telepresence conferencing, and many other forms of conferencing and telecommunication (including forms of telecommunication falling within telephony, IP telephony, radio telephony, and the like). In the system 10 according to the example embodiment of FIG. 6, some of the provided forms of telecommunication involve communication across different types of telecommunication networks, such as between IP networks (and/or other packet-switched networks) and PSTNs (and/or other circuit-switched networks). Accordingly, in the example embodiment of FIG. 6, the telecommunication server 14a can be in communication with and logically coupled to the following teleconferencing support devices 16, as would be appreciated by one of skill in the art upon reading the present specification: a signaling server 16a (e.g., a third-party call control or 3PCC server), a teleconference media controller 16b (e.g., a multipoint control unit/teleconferencer) (or other videoconferencing server/system), and a presence server 16c. In other embodiments implemented to provide other forms of telecommunication, the management system 12 can include yet other teleconferencing support devices 16 enabling/supporting yet other types of cross-network teleconferencing, multi-participant bridging, etc., as would be appreciated by one of skill in the art upon reading the present specification.

The signaling server 16a is configured to be initiated and instructed by the telecommunication server 14a to control (e.g., initiate and manage) telecommunication between telecommunication devices 22a, 22b. Additionally, depending on the particular implementation of a controller and adaptations to the protocols used, the signaling server 16a can include a back-to-back user agent system (B2BUA, not depicted in FIG. 6) for enabling additional call management features (e.g., billing, automatic call disconnection, call transfer, etc.), network interworking, hiding of various internal aspects of a network (e.g., private addresses, network topology, etc.). Additional signaling components (e.g., firewall bypassing components) can be also included, as would be appreciated by one of skill in the art upon reading the present specification.

The teleconference media controller 16b is configured to bridge/interconnect multiple conferencing calls (e.g., multimedia conferencing calls, videoconferencing calls, etc.) from several telecommunication devices 22a, 22b.

The presence server 16c is configured to provide the telecommunication server 14a with presence information (e.g., status indications, etc.) about the ability and willingness of participants to join/participate in a teleconference, as would be appreciated by one of skill in the art upon reading the present specification. Presence information from the presence server 16c can be utilized by the telecommunication server 14a to determine whether (and when) to initiate step 108 of sending participant invitations. Moreover, presence information can be conveyed to participants during a teleconference, such as to indicate that a participant listed in a teleconference request as a participant invitee has not been invited due to that participant being listed as currently unavailable. In some embodiments, whenever an application on a telecommunication device 22a, 22b enabling a hosted form of telecommunication is opened by a participant (e.g., a participant registered in the management system 12 and/or represented in the participant records 32), that telecommunication device 22a, 22b begins transmitting presence information with the telecommunication server 14a.

In the example embodiment of FIG. 6, the management system 12 additionally is coupled to one or more sub-band coding to high-definition voice (SBC to HD voice) and public switched telephone network media gateway (PSTN GW) devices 30. The SBC to HD voice and PSTN GW device(s) 30 can be used to provide high quality signals and media streams to telecommunication devices 22a, 22b during teleconferences, and can be used to enable proper interfacing between the protocols implementing the PSTN telephone signals/networks (e.g., and/or other circuit-switched networks) and the protocols implementing the IP-based signals/networks, etc. (e.g., and/or other packet-switched networks). More specifically, the SBC to HD voice and PSTN GW device(s) 30 can be logically coupled to the teleconference media controller 16b for transmitting media streams, and can also be logically coupled to the signaling server 16a for transmitting signaling information used in establishing and initiating teleconferences.

Additionally or alternatively to coupling with SBC to HD voice and PSTN GW device(s) 30 that are external to the management system 12, the management system 12 can include one or more SBC to HD voice and PSTN GW device(s) 30. For example, in some implementations it may be desirable for the SBC to HD voice and PSTN GW device(s) 30 to be integrated, locally-hosted components of the management system 12. Furthermore, although the SBC to HD voice and PSTN GW device(s) 30 are depicted in FIG. 6 as separate components from the telecommunication networks 20a, 20b, one of skill in the art will appreciate that the SBC to HD voice and PSTN GW device(s) 30 alternatively or additionally can be components of the telecommunication networks 20a, 20b, e.g., depending on the capabilities and network nodes forming the telecommunication networks 20a, 20b.

In illustrative embodiments, a participant is enabled by the system 10 of FIG. 6 to submit a request to schedule a teleconference by (a) sending an email message to invited participants, (b) listing the details of the requested teleconference in the email message (e.g., in the subject, the body, in one or more fields of a calendar invite, etc.), and/or (c) including as a recipient of the email message a specified email address for an email account managed and monitored by the email server 24. The email server 24 thus receives the email containing the teleconference request and sends the received teleconference request to the telecommunication server 14a in a suitable form. For example, the email server 24 can extract, parse, and/or otherwise decode/analyze the information in the email message (e.g., recipients, field entries, etc.) to determine the details of the teleconference being requested (e.g., time, date, subject, participant invitees, etc.). The email server 24 can send the received teleconference request to the telecommunication server 14a in the decoded/analyzed form. Alternatively or additionally, the email server 24 can send the teleconference request to the telecommunication server 14a in its original email format. One of skill in the art will appreciate yet other suitable forms and formats that the teleconference request can assume when being sent from the email server 24 to the telecommunication manager 14. All such alternatives and modifications are contemplated within the scope of the present invention. The example embodiment of FIG. 6 is not limited to any particular format in which the teleconference request is sent from the email server or received by the telecommunication manager 14.

Figure 7:
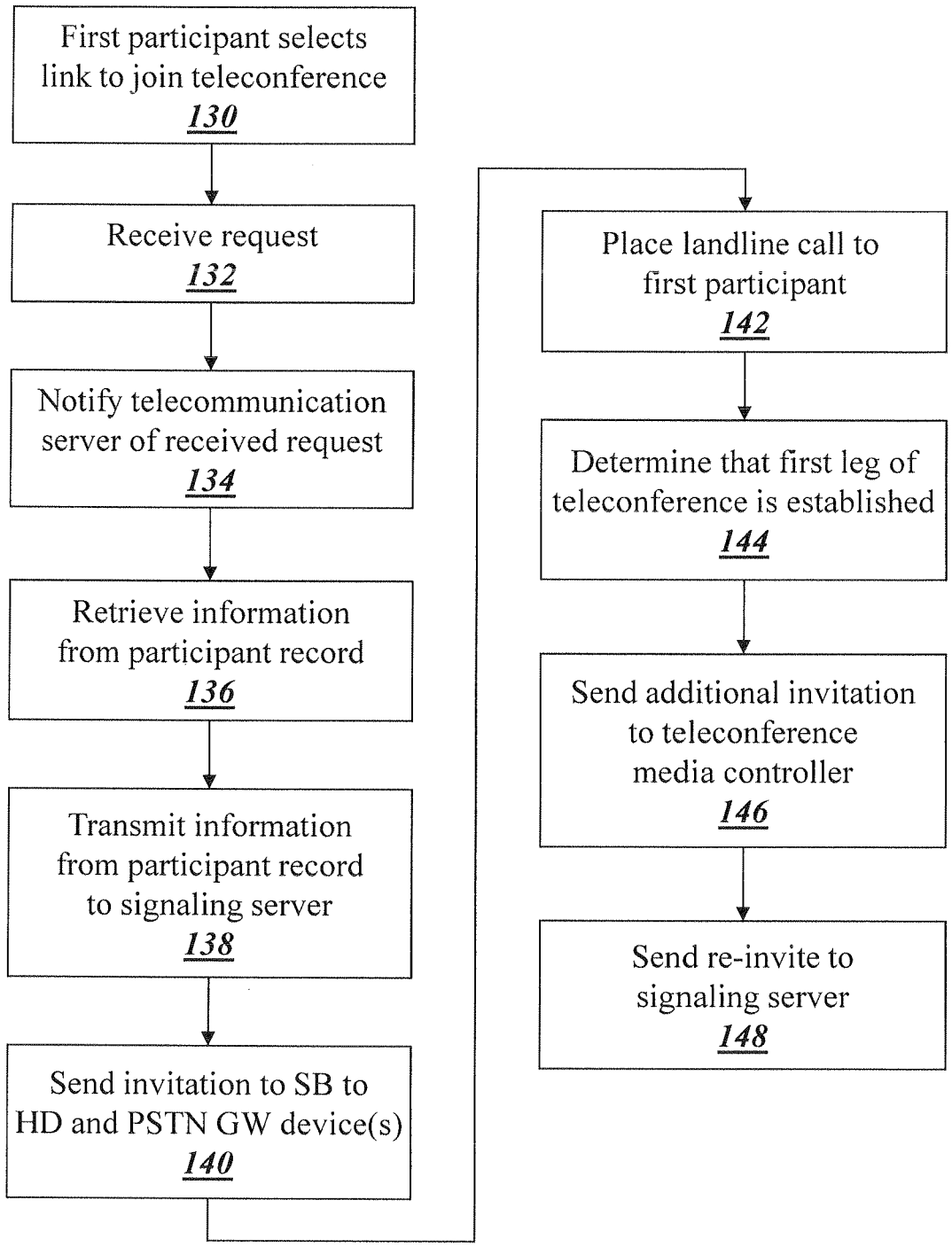
FIG. 7 is a flow chart of a method for performing step 110 of FIG. 6 of initiating a multi-participant telecommunication conference according to aspects of the present invention.

Turning to FIG. 7, an example embodiment of a method by which the system 10 of FIG. 6 performs step 110 of initiating a multi-participant teleconference will now be described, in which the teleconference is initially established on a landline telephone, in accordance with illustrative aspects of the present invention. While the particular steps are representative of a possible iteration of the operation of the present invention, one of skill in the art will appreciate that the example provided is by no means limiting to the invention disclosed herein. At a scheduled time, a first participant requests to join a teleconference by selecting a hyperlink sent in an initial invitation (step 130). For example, the hyperlink can be sent to the participant in step 114 of FIG. 5. The action by the first participant in step 130 causes the link server(s) 26 to receive a teleconference request through at least one input device (step 132). The links server(s) 26 notify the telecommunication server 14a of the received request and include in the notification details of the request (e.g., originating participant, participant invitees, requested teleconference date and time, etc.) (step 134). The telecommunication server 14a uses the information in the notification of the received request to retrieve the preferred form of telecommunication 36 and contact information 38 from the participant record 32 associated with the first participant (step 136), as described previously herein with regard to step 104 of FIG. 3. Assuming that the first participant to request to join the teleconference does not have any preferred triggers 40, the information from the participant record 32 is transmitted from the telecommunication server 14a to the signaling server 16a (step 138).

In the example embodiment of FIG. 7, landline telephone calling is the preferred form of telecommunication 36 for the first participant. As such, the signaling server 16a uses the information from the participant record 32 (preferred from of telecommunication 36 and/or contact information 38) transmitted in step 138 to send an invitation to the SBC to HD voice and PSTN GW device(s) 30 (step 140). Based on the invitation being sent in step 140, the SBC to HD voice and PSTN GW device(s) place a phone call to the landline number of the first participant (step 142), e.g., by communicating with a PSTN across the public telecommunication network 20a. Once the first participant connects to the SBC to HD and PSTN GW device(s) 30 (e.g., on a telecommunication device 22a coupled to the public telecommunication network 20a), the signaling server 16a determines that a first leg of the teleconference has been established (step 144). Once the signaling server 16a makes the determination of step 144, the signaling server 16a sends an additional invitation to the teleconference media controller 16b containing media information of the first leg (step 146). This enables additional participants to connect to the teleconference using, e.g., video conferencing software running on a telecommunication device 22a, 22b. Once a second participant connects to the teleconference, the signaling server 16a determines that a second leg of the teleconference has been established (step 146). In the example method of FIG. 7, the second participant connects to the teleconference using video conferencing software provided on a telecommunication device 22b coupled to the management system 12 via the private telecommunication network 20b. Accordingly, once this second leg is determined to be established in step 146, the signaling server 16a sends a re-invite (e.g., as implemented using SIP) to the SB to HD and PSTN GW device(s) 30 to establish a two-way media teleconference between the first and the second participants (step 148).

In the same or similar manners, additional media streams can be added as additional participants join the teleconference, e.g., depending on the forms of telecommunication being used to connect to the teleconferences. For example, as additional video conferencing connections are made with the management system 12, the MCU/teleconferencer bridges the additional connections.

Upon reading the present specification, one of skill in the art will appreciate that the example method of FIG. 7 is illustrative and in no way limits operation of the system 10 of the example embodiment of FIG. 6. For example, the order and timing of sending invitations can be changed such that any participant receives an initial invitation at virtually any time during set-up or duration of the teleconference (e.g., invitations optionally can be sent simultaneously, at various specified times, and/or in different specified orders, etc.). Furthermore, the various forms of telecommunication, the types of invitations that are sent, the various legs of the invitations, and the like can be altered based on the particular preferred forms of telecommunication of the participants, as would be appreciated by one of skill in the art upon reading the present specification.

Data and information communicated from the telecommunication server 14a to the email server(s) 24, links server(s) 26, web server(s) 28, storage device(s) 18, signaling server 16a, teleconference media controller 16b, and presence server 16c (and vice versa) can be implemented using remote procedure call (RPC), as would be appreciated by one of skill in the art upon reading the present specification. In the example embodiment of FIG. 6, the system 10 establishes teleconferences using SIP and transfers media streams using real-time transport protocol (RTP). Upon reading the present specification, one of skill in the art will appreciate yet other ways to transfer data and provide communication signaling, as well as other application layer control protocols (e.g., session description protocol) that can be utilized in addition or as alternatives to those described herein. All such alternatives are contemplated within the scope of the present invention.

The system 10 and the manner in which it is implemented can vary depending on the various forms of telecommunication being supported. The examples of FIGS. 6 and 7 are provided for purposes of illustration and are in no way limit embodiments of the present invention. For example, a variety of different teleconferencing support devices 16, different telecommunication networks 20, different communication protocols or implementations thereof (e.g., types of signaling, selection of application layer control protocols, forms of data transfer, compatibility with firewalls, etc.), different computer architectures (e.g., for the telecommunication manager 14 and/or for the teleconferencing support devices 16), and the like will be appreciated by one of skill in the art upon reading the present specification. All such alternatives and modifications are contemplated within the scope of the present invention. Furthermore, additional devices can be included to provide yet further teleconferencing and communication capabilities. For example, the system 10 can be adapted with communication protocols independence. In some example embodiments, the system 10 is configured to support universal mobile telecommunications systems (UMTS), e.g., to further provide compatibility/capability with 3G mobile cellular technology (e.g., audio streams and/or video streams in 3GPP and/or 3GPP2 file format).

The example embodiments of the present invention are described herein with reference to invitations listing participants that are represented by the participant records 32, and for whom at least one preferred form of telecommunication 36 exists. It should also be appreciated that in some embodiments, participants requesting to organize a teleconference may provide contact information for any participants being invited that are not represented in the one or more participant records 32. For example, the management system 12 can be adapted to enable participants to register user accounts. The account registration process can include collecting information for creating a participant record 32, e.g., a preferred form of telecommunication 36, contact information 38, one or more preferred triggers 40, etc. In such embodiments, organizing participants submitting a teleconference request can be enabled to include, in the teleconference request, forms of telecommunication and/or the contact information for any non-registered participants named in the telecommunication request. In other embodiments, organizing participants are restricted from naming (as invitees in a conference request) any participants not registered in the management system 12. It should be appreciated that embodiments of the present invention are not limited to these exemplary ways to include participants unrepresented in the participant records 32 in teleconferences being requested. One of skill in the art will appreciate a wide variety of alternative ways to provide such teleconferencing capability among both participants that are represented in the participant records 32 and participants that are not represented in the participant records 32. All such alternatives and modifications are contemplated within the scope of the present invention.

The system can restrict the types of users that can act as organizing participants, or can be "open" and unrestricted in this regard. Similarly, participants can be restricted in which participants they are permitted to invite to a teleconference. Moreover, any types of participants can be included. In illustrative embodiments, the participants are human (i.e., humans operating the telecommunication devices 22). However, it is entirely possible for non-human participants to be included in the system 10 according to embodiments of the present invention. For example, intelligent computers can be included in teleconferences, as well as computer resources that are remote from one or more other participants (e.g., proprietary software applications, remote databases, etc.). One of skill in the art will appreciate a wide variety of types of participants that can be included in the system 10 upon reading the present specification. All such embodiments are contemplated within the scope of the present invention.

Although the example embodiments are described herein with reference to only one preferred form of telecommunication 36 per participant, it should be appreciated that more preferred forms of telecommunication 36 can be included per participant (e.g., and per participant record 32). In some embodiments, participants are enabled to provide multiple preferred forms of telecommunication 36. The multiple preferred forms of telecommunication 36 can be used one-at-a-time when initiating a teleconference with the participant, or can be used simultaneously when initiating a teleconference with the participant. For example, a participant can be enabled to request for the management system 12 to both call the participant on his/her home phone and on his/her work phone when attempting to initiate a teleconference with the participant. The multiple preferred forms of telecommunication 36 can be ranked by the participant, to provide the management system 12 with multiple ways to attempt to contact the participant (e.g., "send me a video chat invitation if I am online, then call me on my cell phone if I don't answer the video chat invitation or if I am not online"). The multiple preferred forms of telecommunication can be associated with different preferred triggers 40 or other criteria that must be satisfied in order for the management system 12 to utilize that particular preferred form of telecommunication 36 (e.g., "call me on my work phone between the hours of 9 AM and 5 PM, Monday through Friday; and call me on my cell phone between the hours of 5 PM and 7 PM, Monday through Friday"; "for teleconferences involving Bob, call me on my cell phone; for teleconferences with Bill, call me on my work phone"; etc.). One of skill in the art will appreciate yet other ways to implement multiple preferred forms of telecommunication 36. All such embodiments are contemplated within the scope of the present invention. Embodiments of the present invention are not limited to the example provided herein, which are described for purposes of illustration.

In general, any suitable computing device can implement the system 10, the management system 12, and the various components of which the systems 10, 12 are comprised. For example, the telecommunication manager 14 can be implemented using one or more real or virtual computing devices, or it or can be implemented as executable instructions stored in one or more non-transitory computer readable storage devices and distributed across one or more real or virtual computing devices, as would be appreciated by one of skill in the art.

Figure 8:
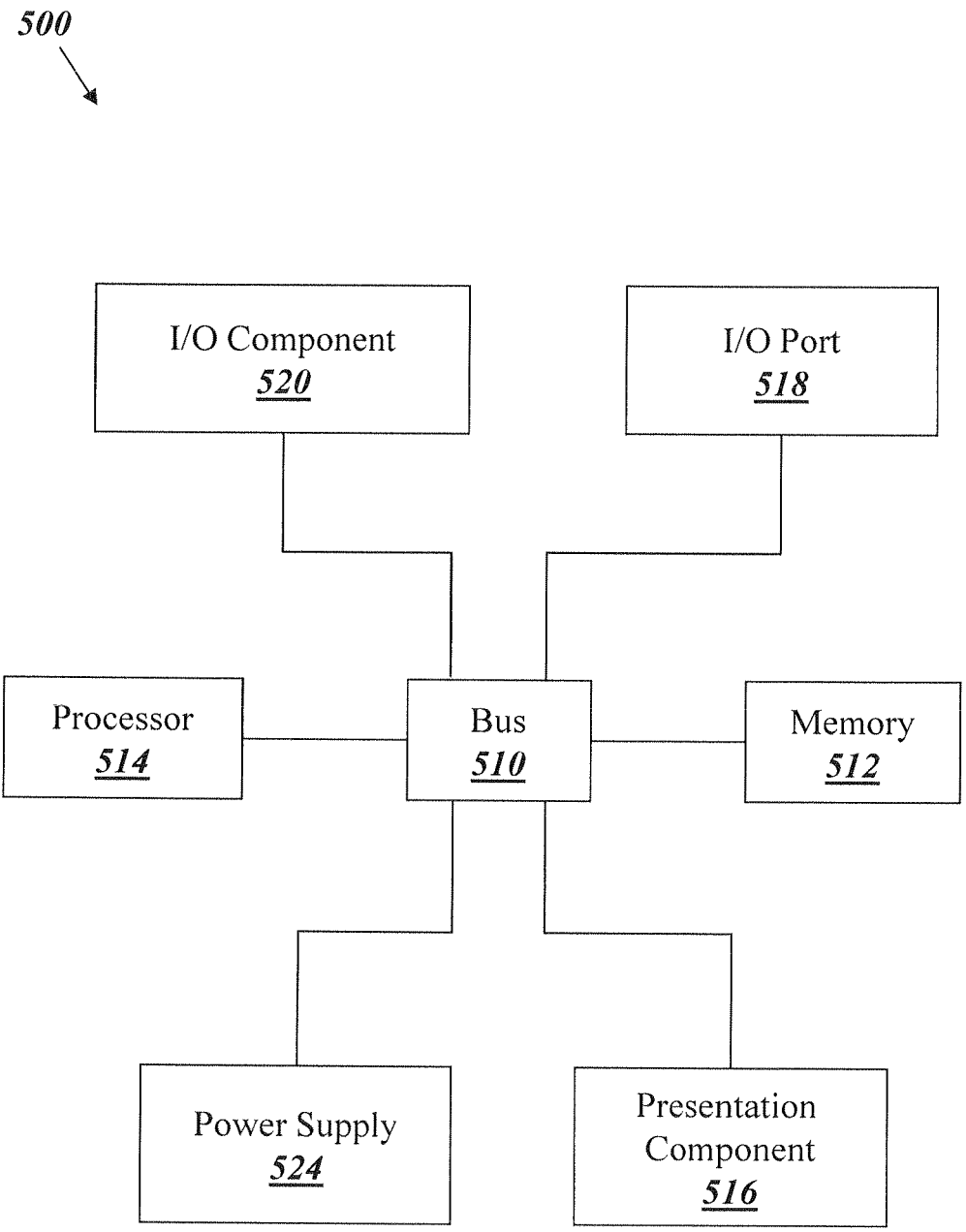
FIG. 8 is a diagrammatic illustration of a computing system for implementing one or more of the components of the system of FIGS. 1 and 6, according to aspects of the present invention.

As one non-limiting example, FIG. 8 illustrates a computing device 500 for implementing illustrative methods and systems (and components thereof) of the present invention. The computing device 500 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 520, etc. Presentation component(s) 516 present data indications to a user or other device. Exemplary presentation components include a display device, speaker, printing component, vibrating component, etc.

The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

One of skill in the art will appreciate a wide variety of ways to modify and alter the system 10 of FIG. 1, as well as the various components with which it interacts. For example, the one or more participant records 32 can be implemented according to any number of suitable data structures. Additionally, although the components of FIG. 1 are depicted as discrete blocks and elements, in fact the system 10 may be implemented in such a way that multiple of the depicted components are implemented with just a single component. Similarly, in some embodiments it may be desirable to implement the system 10 using multiple iterations of the depicted components or additional components, as would be appreciated by one of skill in the art. Furthermore, while some components are depicted as included within the system 10, it should be understood that, in fact, the depicted modules alternatively can be excluded from the system 10 as would be appreciated by one of skill in the art upon reading the present specification. A variety of to ways to expand, reduce, or otherwise modify the system 10 will be appreciated by one of skill in the art upon reading the present specification. All such modifications and alternatives are contemplated within the scope of the present invention.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for initiating a telecommunication connection between two or more participants, comprising:
   a telecommunication manager configured in such a way as to manage selection of a form of telecommunication for each of the two or more participants when the telecommunication connection is desired between a plurality of telecommunication devices operable by the two or more participants; and
   a plurality of participant records stored on one or more storage devices, the one or more storage devices in communication with the telecommunication manager and each of the plurality of participant records comprising at least one participant identifier each for identifying a respective participant of the two or more participants as being associated with a respective participant record of the plurality of participant records;
   wherein each of the plurality of participant records includes indications of a preferred form of telecommunication for the respective participant associated with the respective participant record of the plurality of participant records when the telecommunication connection is desired;

wherein at least one respective participant of the two or more participants is associated with their own respective participant record of the plurality of participant records identified by the at least one participant identifier;

wherein when the telecommunication connection is desired by a first of the two or more participants, the telecommunication manager manages connection of the first of the two or more participants and each of a remainder of the two or more participants based on respective participant records associated with the first of the two or more participants and the remainder of the two or more participants;

wherein the preferred form of telecommunication for each of the remainder of the two or more participants is determined by the telecommunication manager searching the respective participant records associated with each of the two or more participants;

wherein a participant record associated with at least one of the remainder of the two or more participants indicates a different preferred form of telecommunication than a first participant record associated with the first of the two or more participants; and wherein when only one participant of the remainder of the two or more participants has indicated the preferred form of telecommunication prior to initiation of the telecommunication connection, others of the remainder of the two or more participants are contacted by the system upon the initiation of the telecommunication connection without having previously indicated a preferred form of telecommunication.

2. The system of claim 1, further comprising a presence server in communication with the telecommunication manager, wherein the presence server manages information regarding availability, capability, and desirability of participants to communicate.

3. The system of claim 1, further comprising a third party call control server in communication with the telecommunication manager, wherein the third party call control server is configured to set up and manage the telecommunication connection between the two or more participants.

4. The system of claim 1, further comprising a video conferencing server in communication with the telecommunication manager, wherein the video conferencing server is configured to interconnect a plurality of video conference telecommunication connections.

5. The system of claim 1, wherein the telecommunication connection is configurable between multiple different telecommunication devices contemporaneously.

6. The system of claim 5, wherein the multiple different telecommunication devices comprise one or more of telephones, mobile phones, internet phones, computers, smart phones, tablets, personal video units, or video phones.

7. The system of claim 1, wherein the telecommunication manager is configured to cause the two or more participants to be provided with a hyperlink clickable to initiate the telecommunication connection.

8. The system of claim 1, wherein the indication of the preferred form of telecommunication comprises telephone, VOIP, video conference, computer, text message, instant message, or shared screen or desktop.

9. The system of claim 1, wherein the preferred form of telecommunication comprises a selection of one or more of device, telecommunication technology, event trigger, or time trigger.

10. The system of claim 1, wherein the telecommunication connection occurs utilizing two or more of a telephone, a mobile device, a computer, a video device, an analog device, a digital device, a messaging device, an email device, a VOIP device, a chat device, an electronic presence device, a virtual presence device, or any combination thereof.

11. A method of initiating a telecommunication connection between two or more participants, comprising:

a telecommunication manager initiating a telecommunication by causing, using at least one processor, a request to be sent to each of the two or more participants based on information obtained from a plurality of participant records stored in one or more data storage devices, each participant record of the plurality of participant records comprising at least one participant identifier for identifying a participant of the two or more participants as being associated with a respective participant record of the plurality of participant records;

wherein each of the plurality of participant records includes indications of a preferred form of telecommunication for the respective participant associated with the respective participant record of the plurality of participant records;

wherein at least one respective participant of the two or more participants is associated with their own respective participant record of the plurality of participant records identified by the at least one participant identifier;

the telecommunication manager receiving, through at least one input device, responses to the request from at least one of the two or more participants, the responses being in the form of a telecommunication request to establish the telecommunication connection between the two or more participants;

wherein when only one participant of the two or more participants has indicated the preferred form of telecommunication prior to initiation of the telecommunication connection, others of the two or more participants are contacted by the system upon the initiation of the telecommunication connection without having previously indicated a preferred form of telecommunication;

wherein when the telecommunication connection couples together each of the two or more participants, forms of telecommunication are selected by the telecommunication manager according to the preferred form of telecommunication as indicated by each of the plurality of participant records associated with each of the two or more participants; and wherein a preferred form of telecommunication for a first participant of the two or more participants is selected by the telecommunication manager according to the preferred form of telecommunication as indicated by a first of the at least two of the plurality of participant records associated with the first participant and another preferred form of telecommunication for a second participant of the two or more participants is selected by the telecommunication manager according to the preferred form of telecommunication as indicated by a second of the plurality of participant records associated with the second participant.

12. The method of claim 11, further comprising a presence server managing information regarding availability, capability, and desirability of participants to communicate, the presence server being in communication with the telecommunication manager.

13. The method of claim 11, further comprising a third party call control server setting up and managing the telecommunication connection between the two or more participants, the third party call control server being in communication with the telecommunication manager.

14. The method of claim 11, further comprising a video conferencing server interconnecting a plurality of video conference telecommunication connections, the video conferencing server being in communication with the telecommunication manager.

15. The method of claim 11, wherein the telecommunication connection is configurable between multiple different telecommunication devices contemporaneously.

16. The method of claim 15, wherein the multiple different telecommunication devices comprise one or more of telephones, mobile phones, internee phones, computers, smart phones, tablets, personal video units, or video phones.

17. The method of claim 11, wherein the telecommunication manager causes the two or more participants to be provided with a hyperlink clickable to initiate the telecommunication connection.

18. The method of claim 11, wherein the preferred form of telecommunication comprises a selection of one or more of device, telecommunication technology, event trigger, or time trigger.

19. The method of claim 11, wherein causing the request to be sent to each of the two or more participants comprises causing a telecommunication invitation to be sent to each of the two or more participants, wherein for at least one of the two or more participants the telecommunication invitation is specific to a preferred form of telecommunication indicated in one of the plurality of participant records.

20. The method of claim 11, further comprising receiving from one of the two or more participants, through at least one input device, a teleconference request to initiate or schedule a teleconference between the two or more participants, wherein the step of initiating the telecommunication is based on the step of receiving the teleconference request.

21. The method of claim 20, further comprising the telecommunication manager causing, using at least one processor, a notification of the requested teleconference to be sent to each of the two or more participants prior to the step of initiating the telecommunication.

22. The method of claim 11, wherein causing the request to be sent to each of the two or more participants comprises accessing one or more remote storage devices in real time to obtain contact information enabling at least one of the two or more participants to be contacted using a preferred form of telecommunication as indicated in one of the plurality of participant records.

\* \* \* \* \*